United States Patent [19]

Dupont

[11] Patent Number: 5,729,542
[45] Date of Patent: Mar. 17, 1998

[54] METHOD AND APPARATUS FOR COMMUNICATION SYSTEM ACCESS

[75] Inventor: Pierre B. Dupont, Whistler, Canada

[73] Assignee: Motorola, Inc., Schaumburg, Ill.

[21] Appl. No.: 560,258

[22] Filed: Nov. 21, 1995

Related U.S. Application Data

[63] Continuation-in-part of Ser. No. 495,385, Jun. 28, 1995, and Ser. No. 522,649, Sep. 1, 1995.

[51] Int. Cl.$^6$ .................................................. H04Q 7/30
[52] U.S. Cl. .......................... 370/346; 370/444; 370/455; 370/462; 455/512; 455/513
[58] Field of Search ...................... 370/230, 232, 370/337, 345, 346, 347, 442, 443, 444, 455, 461, 462; 340/825.51; 455/450, 452, 509, 512, 513

[56] References Cited

U.S. PATENT DOCUMENTS

| | | | |
|---|---|---|---|
| 5,134,714 | 7/1992 | Janzen et al. | 370/444 |
| 5,436,905 | 7/1995 | Li et al. | 370/346 |
| 5,574,728 | 11/1996 | Mamaghani et al. | 370/462 |
| 5,583,850 | 12/1996 | Snodgrass et al. | 370/346 |

OTHER PUBLICATIONS

Rivest, Ronald L., "Network Control by Bayesian Broadcast", *IEEE Transactions on Information Theory*, vol. IT-33, No. 3, May 1987, pp. 323–328.
Robertson, Clark R. et al., "A Model for Local/Mobile Radio Communications with Correct Packet Capture", *IEEE Transactions on Communications*, vol. 40, No. 4, Apr. 1992, pp. 847–854.

*Primary Examiner*—Benedict V. Safourek
*Attorney, Agent, or Firm*—J. Ray Wood

[57] ABSTRACT

A method and apparatus for accessing a communication system relies on the use of varying access probabilities for subscribers or messages of varying priority. A serving infrastructure entity (e.g., a base station) determines access probabilities (e.g., $p_{hi}$ and $p_{lo}$, where there are two classes of subscribers) in response to known system parameters like the current rate of access attempts for each priority class of user/message. Values representative of these access probabilities are then transmitted to the subscriber unit(s), for example by use of a system broadcast channel or control channels. These values are then used by the subscriber units in determining when to access an uplink channel. A temporal and/or proportional priority distribution approach is preferably used in determining the access values. As a result of this contention-based prioritization, an expedited access is achieved by higher priority units/traffic, thus increasing their throughput.

25 Claims, 3 Drawing Sheets

P-PERSISTENCE PARAMETERS
| PRIORITY (N) | $P_N$ | $W_N = 1/P_N$ |
|---|---|---|
| 1 | .05 | 20 |
| 2 | .03 | 33 |
| 3 | .025 | 40 |
| 4 | .02 | 50 |
*FIG.4*
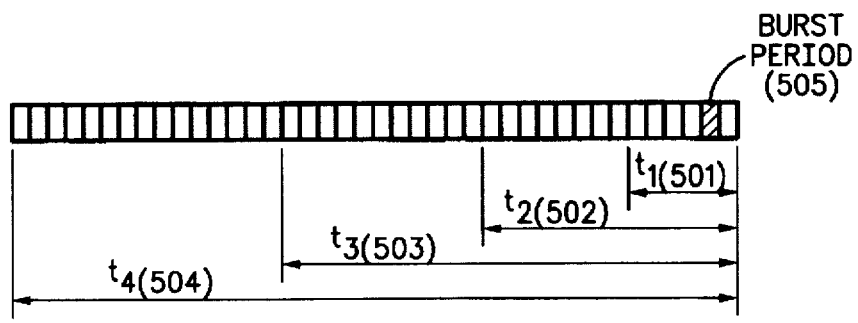
$t_1$: PRIORITY 1 ACCESS REQUEST PERIOD
$t_2$: PRIORITY 2 ACCESS REQUEST PERIOD
$t_3$: PRIORITY 3 ACCESS REQUEST PERIOD
$t_4$: PRIORITY 4 ACCESS REQUEST PERIOD
*FIG.5*
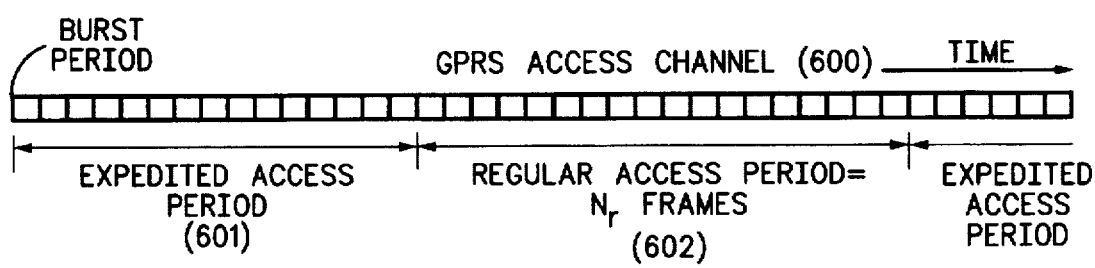
*FIG.6*

METHOD AND APPARATUS FOR COMMUNICATION SYSTEM ACCESS

RELATED APPLICATIONS

The present application is a continuation-in-part of copending U.S. application Ser. Nos. 08/495,385 filed Jun. 28, 1995, and 08/522,649 filed Sep. 1, 1995, both commonly assigned together with this application to Motorola, Inc.

FIELD OF THE INVENTION

The present invention relates to communications and more particularly an improved method and apparatus for communicating data in a wireless communications system.

BACKGROUND

The last 10 years have seen a tremendous increase in the demand for wireless networks capable of handling data communications. Unlike voice services, such as the GSM (Global System for Mobiles) cellular service, in which circuit-switched communications are used because of the sensitivity of users to the timing of oral dialogue, greater efficiencies can be achieved in data communications through the use of packet-switched and hybrid communications. Thus, it is anticipated that a significantly increased throughput can be achieved for shorter traffic by using proposed services such as the GPRS (GSM Packet Radio Service) over traditional circuit-switched wireless technology.

However, with the increased demand for wireless services has also come a demand for faster throughput rates of data traffic, at least for some users. One proposed solution to this need is the use of "quality of service" (QoS) grades for data traffic. By designating a particular data message with a high QoS grade or priority, users who have the need for rapid end-to-end delivery of their data will have their data delivered ahead of lower QoS data. On the other hand, users who do not want to pay the higher QoS rates and can tolerate longer end-to-end delays can designate their data traffic with a lower QoS grade.

A key problem in implementing this type of service for wireless data communications is the delay in obtaining access to a wireless channel. This problem arises because there are only a limited number of channels (or in the case of TDMA (time division multiple access) systems like GSM, subchannels/time slot sets) available for any given base station service area. Any delay in access will mean a decrease in the time the subchannels are available for actual data transmissions. Further, as the system approaches peak loading, there may well be many more mobile stations (MSs, or more generally subscriber units) attempting to gain access than can be accommodated by the system.

In order to reduce access delay in other wireless systems a number of medium access control (MAC) protocols have been proposed, including both non-contention systems, and well-known contention systems like ALOHA, Slotted-ALOHA, reservation ALOHA, CSMA (Carrier-Sense Multiple Access), DSMA (Digital-Sense Multiple Access), PRMA (Packet Reservation Multiple Access) and QCRA (Queued Contiguous Reservation Aloha). Enhancements to such systems have also been proposed using control algorithms to modify access probabilities. Thus, e.g., pseudo-Bayesian control techniques have been suggested to modify slotted-ALOHA systems based on the number of access attempts per given time period. Using such a technique, a base station might broadcast a persistence value $p = \beta / v$ periodically, where $\beta$ is a constant and $v$ is an estimate of the current number of ready communication units (e.g., meaning those communication units with data to transmit at that time (e.g., a burst period)). A ready user transmits an access request with probability p during any available access burst period. Thus a persistence value is a maximum permitted probability of making an access request at a given access opportunity.

A problem with the standard prior art approaches is that any given access scheme is applied to all units equally. Even where some QoS scheme was used in assigning traffic channels, accessing the system may take significantly longer during higher loading, making for undesirable delays for the high priority traffic.

There remains therefore a need for an improved means for data communications in wireless systems that solves these and related problems.

BRIEF DESCRIPTION OF THE DRAWINGS

FIG. 4 is a table illustrating access control parameters for use according to the first embodiment of the invention;

FIG. 5 is a diagram illustrating an uplink multiframe communication channel structure for use according to the first embodiment of the invention;

FIG. 6 is a a diagram illustrating an GPRS access channel structure for use according to a second embodiment of the invention.

DETAILED DESCRIPTION OF THE DRAWINGS

These problems and others are solved by the improved method and apparatus according to the invention. A presently preferred embodiment of the invention is a system for controlling access through the use of varying access probabilities for subscribers of varying priority. This would typically start with a serving base station determining access probabilities (e.g., $p_{hi}$ and $p_{lo}$, where there are two classes of subscribers) in response to known system parameters like the current rate of access attempts for each QoS class. Values representative of these access probabilities are then transmitted to the subscriber unit(s), for example by use of a system broadcast channel or control channels. These values are then used by each subscriber communication unit in determining when to access a communication resource, e.g., an uplink channel. In calculating these values, one may use, e.g., a temporal or a proportional priority distribution as more fully described below. As a result of this contention-based prioritization scheme, an expedited access is achieved by higher priority units, thus increasing the overall throughput.

Figure 1:
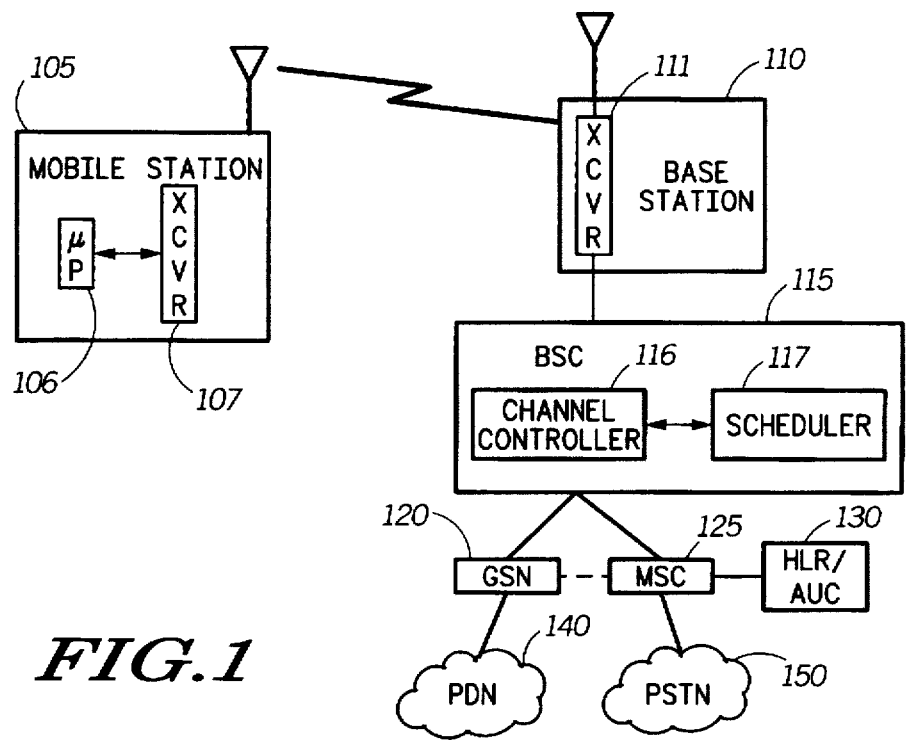
FIG. 1 is a block diagram of a wireless communications system according to first and second embodiments of the invention.

Turning now to FIG. 1, there is generally depicted a wireless communications system 100 having one or more subscriber units (i.e., mobile station (MS) 105) communicating via base station transceiver 111 of base station (BS) 110 and base station controller (BSC) 115. The subscriber unit may be of such diverse types as dedicated data units (e.g., personal digital assistants (PDAs)), radiotelephones (including those adapted for coupling with data terminals like portable computers), or wireless adapter devices (e.g., wireless modems adapted for coupling with computers, message pads, etc.), and the like. In any event, the subscriber unit includes a transceiver 107 and processor 106 appropriately programmed for wireless data communications according to a serving systems protocols. In the illustrated case a combined GPRS-GSM system is shown, although it will be recognized that the embodiments discussed herein are equally applicable to any other wireless communications system, including CDPD (cellular digital packet data), CDMA (code division multiple access), data systems like ARDIS or RAM, etc. Thus, the portion of the GSM system servicing voice/short messaging subscribers includes an MSC (mobile switching center) 125 connected to an HLR/AuC (home location register/authentication center) 130 and PSTN (public switched telephone network) 150. The GPRS portion includes a GSN (GPRS service node) 120 connected to a packet switched PDN (public data network). GSN 120 includes all information necessary for appropriate routing of data messages; it may alternatively be coupled to MSC 125 to allow access to higher layer user information stored at a common platform such as HLR 130. BSC 115 includes a channel controller 116 and scheduler 117, along with typical BSC circuitry. Alternatively, the controller can be co-located with the base station 110, or distributed elsewhere to a further infrastructure entity, depending on the system design employed. Further, the base station 110 should be understood as illustrative of, and thus meaning, any communication unit operable for serving plural other communication units, not just a central communication unit of a wireless service area or cell.

Figure 3:
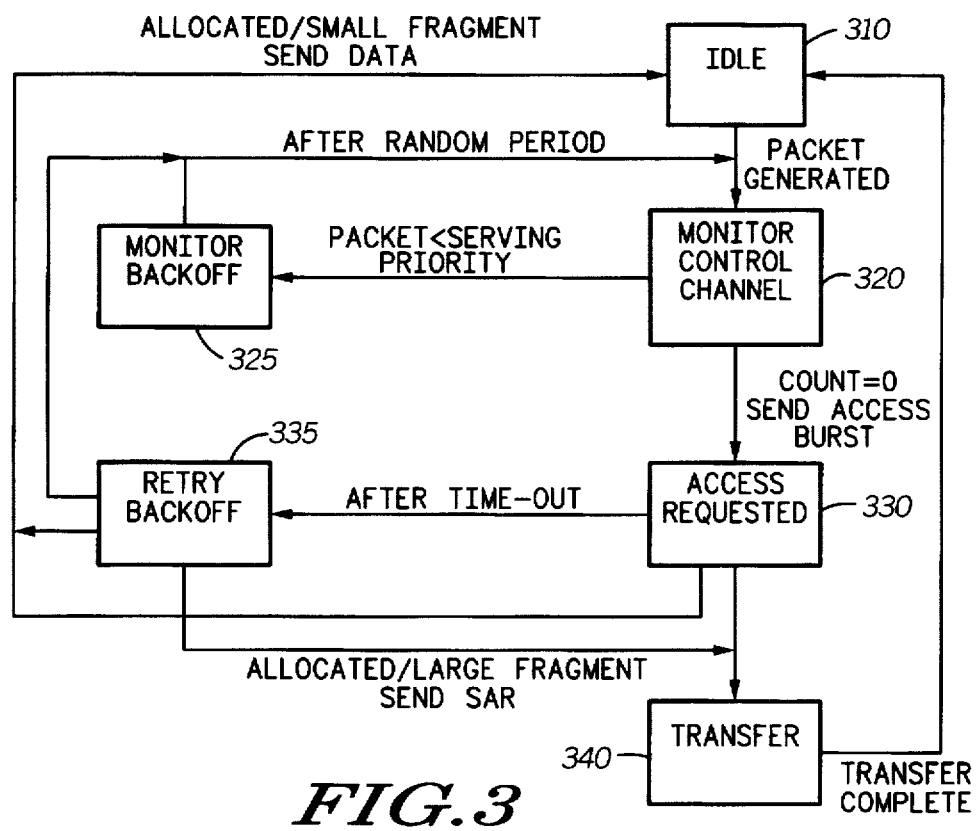
FIG. 3 is a state diagram illustrating transition states for access of the subscriber unit in the wireless communications system of FIG. 1.
Figure 2:
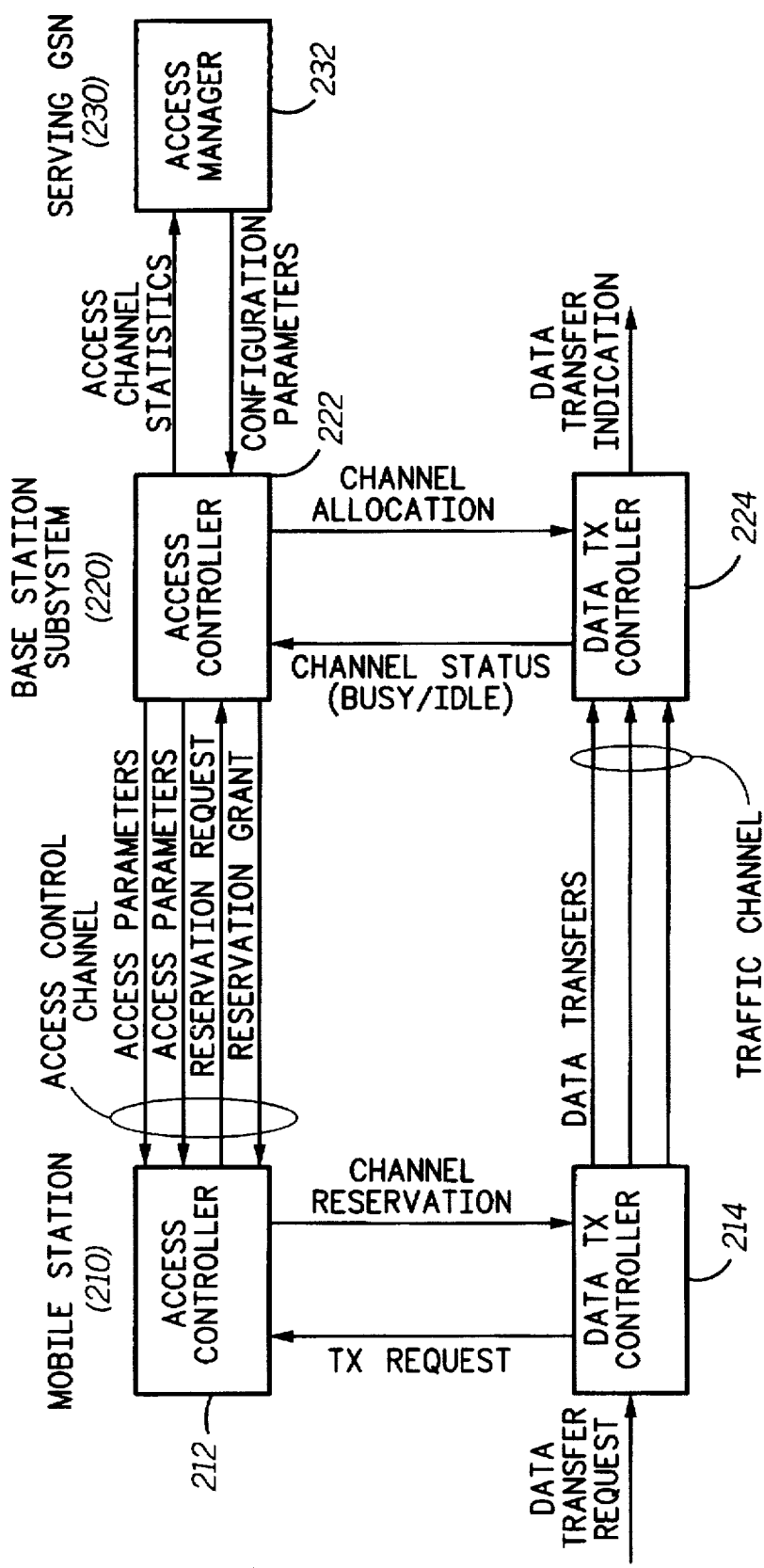
FIG. 2 is a diagram illustrating messaging between different functional entities of the wireless communications system of FIG. 1.

The operation of this system can be further understood by additional reference now to FIGS. 2 and 3. In FIG. 2, the control/traffic communications flow among the MS 210, BS subsystem 220 and GSN 230 is generally depicted. Both MS 210 and BS/BSC 220 include access controllers (212 and 222 respectively) and data transmission controllers (214 and 224 respectively), which GSN 230 includes an access manager 232. Current configuration parameters, including loading and service priority information derived from usage and access channel statistics, is communicated between the GSN 230 and BS/BSC access controller 222. Based on this information access control parameters are determined and broadcast in an access control message via the BS to MSs in the BS service area. These access parameters are preferably the current service priority level and access probability parameters. When the MS data transmission controller 214 receives a data transfer request, a transmission request message is transferred to the access controller 212 (i.e., moving from state 310 to monitor state 320 of FIG. 3). Based on the access control parameters and its data message priority, MS access controller 212 determines whether to send an access message/request (state 330) or backoff (state 325), and BS/BSC access controller 222 determines whether to allocate communications resource(s) in response to such a request. After a time-out period and no response, MS 210 again retries access (state 335). Upon allocation, access controller 222 notifies both MS 210 and data receiver controller 224 of the subchannel allocation, and the data transmitter controller 214 and data receiver controller 224 commence transfer of the data (state 340).

In order to facilitate transfer of higher priority data, a contention-based procedures is employed to limit MS access requests. A preferred contention-based procedure, illustrated with reference to FIGS. 4 through 6, uses two or more access probabilities (e.g., $p_{hi}$ and $p_{lo}$, or $p_1, p_2, \ldots, p_n$ if more than two probability levels) to control the access attempts by different priority classes of subscribers. Two particularly useful approaches for determining the access values are the following proportional and temporal priority distribution approaches. In a preferred proportional priority distribution, one starts with a pseudo-Bayesian algorithm modified to consider a three state feedback: idle, success or collision. While the best approach would be to establish the priority based access probability p for one of all current ready users n (such that p=1/n), the value of n is often unknown. This can be approximated by, e.g., a known pseudo-Bayesian algorithm, derived by approximating the value of n using a Poisson distribution of backlogged users having mean of n. Since this only takes into account collision vs. no collision states, this can be further modified to take into account the effects of capture by taking into consideration the value (e.g., the constant $\beta$) at which the maximum channel throughput occurs, such that $p=\beta/v$. For slotted-ALOHA (S-ALOHA) in GPRS, this has been approximated as about 1.39; one skilled in the art will know how to determine this parameter for other protocols and system conditions.

Following calculation of p, the base station determines a separate probability for the different priority groups. A presently preferred approach is to have a smaller number of priority groups for access purposes than the number of defined QoS classes. This approach reduces the overhead in the repeatedly broadcast p vectors, when separate access values may not be necessary for efficient access. For example, in GPRS proposal has been made for five QoS classes, based on the delay time for end to end throughput. These classes are illustrated in the following table:

| | 128 octet packets | | 1024 octet packets | |
|---|---|---|---|---|
| QoS Class | mean delay | 95% delay | mean delay | 95% delay |
| Class 1 | 0.5 sec | 0.7 sec | 1.2 sec | 1.4 sec |
| Class 2 | 0.5 sec | 2.5 sec | 3 sec | 1.5 sec |
| Class 3 | 5 sec | 25 sec | 15 sec | 75 sec |
| Class 4 | 50 sec | 250 sec | 75 sec | 375 sec |
| Class 5 | best effort | best effort | best effort | best effort |

Because there is a significantly longer delay tolerance for classes 3–5 than for classes 1–2, one can advantageously use two access probabilities—a regular access probability for the group of communication units from classes 3 through 5, and an expedited access probability for the group of communication units from classes 1 and 2, having a higher priority than the other group.

A base station (or BSC, GSN or other controller, depending on the implementational assignment of control features) preferably determines an access probability vector (e.g., one or more words representative of the plural access probabilities i.e., p-persistence values) using the calculated p and additional access parameters. In the preferred embodiment for proportional priority distribution the BS also maintains a running count of the proportion of expedited versus regular access messages received over a predetermined time period. The proportion of regular access requests to the total number of access requests (i.e., regular plus expedited) may be termed $\alpha$, where $0<\alpha<1$. The proportion of expedited access requests is then $1-\alpha$. Alternatively, depending on the implementation one may find it advantageous to keep the value of $\alpha$ within some defined min-max boundaries, for example $\alpha_{min} \leq \alpha \leq \alpha_{max}$, where $\alpha_{min}=0.1$ and $\alpha_{max}=0.9$.

The base station then preferably calculates the group probability values as $$p_{hi}=(1+\alpha) \times p, \text{ and} \qquad \text{Eq. 1}$$

$$p_{lo} = \alpha \times p \quad \text{Eq. 2}$$

This algorithm does not alter the overall probability that an access request will be transmitted during a given burst period, and therefore does not alter the effectiveness of the optimized pseudo-Bayesian technique. That such is the case can be shown by considering the following relationships, starting with the probability $p=\beta/v$ that each ready user will transmit within an individual burst period, where the number of ready users is estimated by v and the optimal throughput is achieved when $pv=\beta$. When all ready users are categorized in two priority groups, high and low, such that $v=v_{hi}+v_{lo}$, then the proportion of low priority ready users is $$\alpha = v_{lo}/v \quad \text{Eq. 3}$$

The two probability values $p_{hi}$ and $p_{lo}$ are then determined as $$p_{hi} = (1+\alpha) \times p = (1+\alpha)\beta/v \text{ and} \quad \text{Eq. 4}$$

$$p_{lo} = \alpha \times p = \alpha\beta/v; \quad \text{Eq. 5}$$

where $p_{hi}$ represents the probability that each of the $v_{hi}$ ready users transmits within an individual burst period, and $p_{lo}$ represents the probability that each of the $v_{lo}$ ready users transmits within an individual burst period. From the above it can be seen that the sum of all transmit probabilities remains constant $\beta$ no matter what the proportional distribution of high and low priority ready users is; i.e., $$\beta = pv = (p_{hi} \times v_{hi}) + (p_{lo} \times v_{lo}). \quad \text{Eq. 6}$$

Substituting the values for $p_{hi}$ and $p_{lo}$ above yields $$\beta = pv = ((1+\alpha)pv_{hi}) + (\alpha pv_{lo}), \quad \text{Eq. 7}$$

which reduces to $$v = (1+\alpha)v_{hi} + \alpha v_{lo} = v_{hi} + (v_{lo}v_{hi}/v) + (v_{lo}v_{lo}/v). \quad \text{Eq. 8}$$

This further reduces from:

$$v_{lo} = v - v_{hi} = (v_{lo}v_{hi}/v) + (v_{lo}v_{lo}/v), \text{ to } v \times v_{lo} = v_{lo}(v_{hi}+v_{lo}), \text{ to } v = v_{hi}+v_{lo} \text{Eq. 9}$$

Thus, it is shown that this algorithm does not alter the overall probability that an access request will be transmitted during a given burst period, and does not alter the effectiveness of the optimized pseudo-Bayesian technique. It therefore better insures that expedited access requests will be transmitted with a higher probability than regular access requests, and meets such preferred system design criterion as (1) increasing loads from low priority users without degrading performance of high priority users; (2) permitting equal priority messages to contend fairly (e.g., by a FIFO (first in first out) rule); and (3) keeping overhead and volume of control information to a minimum.

Again, while the above embodiment has been described in connection with a two group priority scheme, any number n of groups can be used depending on the design criterion for a given system. FIGS. 4 and 5 illustrate the use of n=4 groups/levels of access probability. The probability values i.e., persistence values $p_1, p_2, \ldots p_{no}$ for each group are again determined by the appropriate $p_n$ infrastructure entity (e.g., the BS or BSC) in response to known system parameters like the current rate of access attempts for each group. Values representative of these access probabilities are then transmitted to the subscriber unit(s), for example by use of a system broadcast channel or control channels. These values could simply be the probability values, or could be a more convenient format for efficient communication such as the closest integer $w_n$ (an access window period) to the inverse of the $p_n$ value, with the access values appropriately formatted, e.g., as one or plural control words (i.e., an access control vector).

Each MS then determines whether to transmit during a current access period based on the received access control vector. Where the vector includes access window values such as in FIG. 4, the values are preferably applied by first selecting the value applicable to priority class of the subscriber or, if appropriate to the system, a queued packet or message. A random number or the like is then preferably generated and applied to the selected value to generate a delay value. The subscriber then counts this delay value number of allowed burst periods (i.e., data time slots available for access) before transmitting its access/reservation request; counting is suspended during periods when the MS is not allowed access. Thus, as illustrated in FIG. 5, a priority level 1 packet will have a maximum wait period $t_1$ (501) substantially shorter than periods $t_2$ through $t_4$ (502–504) for priority levels 2 through 4. However, the actual burst period 505 at which an access request is sent could be the same for data traffic of all priority levels (at least those greater than the minimum priority level), although with differing probabilities of occurrence. The use of a random/pseudorandom number or similar user differentiating value permits different outcomes for plural subscribers, so all do not attempt access at the same time. This reduces the collision potential, particularly when service is denied to a whole group for a given period (such as happens in the temporal priority approach below) and then made available again. Alternative uses of a differentiating user-generated value such as a random number will be apparent to a skilled artisan; e.g., instead of determining a window period, between 0 and 1 could be generated each allowed burst period, with an access attempt being permitted if the number is greater than the applicable probability value and otherwise inhibited.

A second embodiment may alternatively be used, in which a temporal priority distribution is employed. In one form, as illustrated by FIG. 6, separate expedited and regular periods are provided on, e.g., a random access channel in which to make access attempts. Assuming for illustration that there are two priority access groups, the BSC (or other appropriate infrastructure entity like a GSN) determines two estimates of the number of ready users, $v_{hi}$ being the estimate of ready high priority users and $v_{lo}$ being the estimate of ready low priority users. Using a pseudo-Bayesian calculation, the access probabilities are $p_{hi}=\beta/v_{hi}$ and $p_{lo}=\beta/v_{lo}$. Each access channel, such as channel 600, is then preferably apportioned into plural (two in this case) access periods, one group of bursts being for expedited access requests and the other being for both regular and expedited access requests. The expedited access period 601 is variable in length and high priority users (e.g., QoS class 1 and 2 subscribers or packets) contend equally using transmit probability $p_{hi}$. The regular access period 602 has a fixed length of Nr frames and regular priority users contend equally using transmit probability $p_{lo}$. The base station preferably keeps track of the current estimate of high priority ready users $v_{hi}$ and regular ready users $v_{lo}$ using the pseudo-Bayesian algorithm described above. During the expedited access period 601 the base station broadcasts the value of $p_{lo}=0$ (indicating that no regular access requests should be transmitted) and $p_{hi}=\beta/v_{hi}$. During the regular access period 602, the base station broadcasts the value of $p_{hi}=p_{lo}=\beta/v$. In other words, both expedited and regular access requests may be transmitted during this period 602 using the same transmit probability.

The transition from expedited to regular access periods preferably occurs as follows: when the base station determines that $p_{hi}=1$ and the channel status is idle for at least one access burst period, then the regular contention period may begin and continue for some fixed duration (Nr frames). The base station knows to begin the regular access period when $p_{hi}=\beta/v_{hi}=1$, because if any ready users remain with an expedited request the burst period status would not be idle (i.e. it would be a success or collision status). Therefore this algorithm provides a level of guarantee that there are no remaining expedited requests to be transmitted when the regular contention period begins, and that an expedited request should not wait longer than Nr frames for an expedited channel access period. The base station may, of course, alter the frequency of the expedited access periods (i.e. the value of Nr), since it controls the broadcast values $p_{hi}$ and $p_{lo}$. An expedited access period occurs whenever $p_{lo}=0$, and a regular access period occurs whenever $p_{lo}>0$.

Alternately, a hybrid of both the temporal and proportional priority distribution approaches may be employed where there are more than two priority groups. Thus, in the case illustrated by FIGS. 4 and 5, a temporal distribution can be effected by setting the broadcast access probability of one or more of the lower priority classes to 0. The remaining priority groups would apply the applicable access value to determine when to attempt access. Alternately, rather than setting some values to 0 an inhibit message can be sent as part of the access control parameters message. These approaches are particularly advantageous in taking advantage of changing loading conditions, without forcing all classes of the lowest group to contend for a significantly shortened access resource. For example, as loading increases a best efforts service (BES, class 5 in GPRS) could be readily set to probability 0 without affecting the QoS delays for classes 1–4. As loading continues to increase, classes 4 to 2 could be progressively shed by setting their probability to 0 as needed to maintain access for the higher priority classes. Of the classes still being served at any time, these users would continue determining when to send an access burst using the proportional priority approach above. But, unlike the temporal priority approach above, when loading is only moderate so as to permit class 1–4 but not class 5 service, there is no requirement for inhibiting all the low group users, i.e., those units that are a member of class 3 or 4, along with class 5 users. If desired, periodic higher priority access periods could be permitted even during moderate loading, set, e.g., to allow an access attempt for users of a given class within some predetermined period related to their QoS delay time. For example, even where there continue to be sufficient class 3 and higher users to otherwise result in class 4 users having a 0 access probability, every 50 seconds (i.e., the guaranteed mean delay period, and ⅕ of the 95% delay period for class 4 users) a period for class 4 access attempts is provided. Further refinements are also possible, such as by allowing the infrastructure entity to vary the access probabilities and inhibits for different channel/subchannel resources as opposed to all resources served, e.g., by a given BS. Likewise, a subscriber's class membership need not remain static, so the group for which a unit is currently a member can be determined by any convenient means such as a unit class, a user class, or even a user-selected priority class for a currently pending/queued data message. Thus, if the subscriber wants to send traffic and a comparison of the access value/priority service level for other subchannels shows that no subchannel is available at the specified priority grade of service/group, the subscriber may optionally chose to either automatically or via user input alter the data priority (and billing) level to a level high enough to permit access requests. Additionally, if other packets of higher priority are queued in the MS, the MS may chose to transmit the higher priority data packets ahead of a currently queued lower priority packet.

One skilled in the art will appreciate that any one of numerous well-known access channel structures and post-contention prioritization schemes may be employed with the invention, each with varying merit depending on the specific design parameters of a given communication system. Thus none are presently preferred, even in the context of GPRS given the presently undecided nature of its standard, but a skilled artisan will be able to readily determine which to apply.

While the invention has been described in conjunction with specific embodiments thereof, it is evident that many alterations, modifications, and variations will be apparent to those skilled in the art in light of the foregoing description. For example, while processor 106, channel controller 116 and scheduler 117, and other circuits, are described in terms of specific logical/functional circuitry relationships, one skilled in the art will appreciate that such may be implemented in a variety of ways, such as appropriately configured and programmed processors, ASICs (application specific integrated circuits), and DSPs (digital signal processors). Further, the invention is not limited to the illustrated cellular systems, but has applicability to any communication system having an access protocol for communication resources (including wireline or fiber optic channels) and differentiated service. It should further be understood that for purposes of this application, a first device or component is responsive to or in communication with a second unit or component regardless of whether the first and second units are directly coupled or indirectly coupled, such as via intermediate units, including switches that operatively couple the units for only a segment of time, as long as a signal path can be found that directly or indirectly establishes a relationship between the first and second units. Thus, it should be understood that the invention is not limited by the foregoing description of preferred embodiments, but embraces all such alterations, modifications, and variations in accordance with the spirit and scope of the appended claims.

We claim:

1. A method of controlling access to a communication resource comprising:

(a) determining from system parameters a first persistence value for a first group of communication units and a second persistence value for a second group of communication units, the first group having a higher priority for communication than the second group; and (b) transmitting an access control message including the first and second persistence values.

2. The method of claim 1, wherein the system parameters include information regarding access attempts by the first and second groups to the communication resource within a predetermined period of time, and step (a) comprises determining the first and second persistence values from the information.

3. The method of claim 1, wherein step (a) further comprises:

(i) providing plural access periods, including a first access period when the second group is inhibited from sending access messages and a second access period when both the first and second groups can send access messages.

4. The method of claim 3, wherein step (a) further comprises, during the first access period:

(ii) determining an approximate number $v_1$ of ready communication units of the first group;

(iii) determining the first persistence value $p_1$ for the first group based on the approximate number $v_1$ of ready communication units and an approximate maximum channel throughput value $\beta$, such that $p_1 = \beta/v_1$; and (iii) setting the second persistence value $p_2$ for the second group to 0 in order to inhibit the second group from sending access messages.

5. The method of claim 3, wherein step (a) further comprises, during the second access period:

(ii) determining an approximate number $v_1$ of ready communication units of the first group and an approximate number $v_2$ of ready communication units of the second group;

(iii) determining the first persistence value $p_1$ for the first group based on the approximate number $v_1$ of ready communication units and an approximate maximum channel throughput value $\beta$, such that $p_1 = \beta/v_1$; and (iv) determining the second persistence value $p_2$ for the second group based on $v_2$ and $\beta$, such that $p_2 = \beta/v_2$.

6. The method of claim 1, wherein the first group of communication units comprises a first class of communication units having a first quality of service level, and step (a) comprises determining the first and second persistence values so as to maintain the first quality of service level for the first group.

7. The method of claim 1, wherein the first group of communication units comprises a first class of communication units having messages to send at a first quality of service level, and step (a) comprises determining the first and second persistence values so as to maintain the first quality of service for any of said messages of the first group.

8. A method of controlling access to a communication resource comprising:

(a) determining from system parameters a first access value for a first group of communication units and a second access value for a second group of communication units, the first group having a higher priority for communication than the second group; and (b) transmitting an access control message including the first and second access values, wherein step (a) further comprises:

(i) determining an approximate number $v$ of ready communication units of both first and second groups;

(ii) determining a first access probability $p_1$ for the first group based on the approximate number $v$ of ready communication units, a proportion $\alpha$ of access requests by the first group to a total number of access requests by the first and second groups during a predetermined period, and an approximate maximum channel throughput value $\beta$, such that $p_1 = (1+\alpha)(\beta/v)$; and (iii) determining a second access probability $p_2$ for the second group based on $v$, $\alpha$ and $\beta$ such that $p_2 = \alpha\beta/v$.

9. A method of accessing a communication resource of a base station comprising, at a first communication unit:

(a) receiving an access control message for the communication resource including a first persistence value for a first group of communication units and a second persistence value for a second group of communication units, the first group having a higher priority for access to the communication resource than the second group;

(b) selecting one of the first and second persistence values based on which one of the first and second groups the first communication unit is currently a member; and (c) determining a probability of sending an access message using said one of the first and second persistence values selected in step (b), and then sending the access message with a determined probability on the communication resource.

10. The method of claim 9, wherein step (b) comprises selecting the first persistence value when the first communication unit is one of the first group of communication units.

11. The method of claim 9, wherein step (b) comprises selecting the second access persistence value when the first communication unit has a message to send having a current priority grade corresponding to a priority grade of the second group of communication units.

12. The method of claim 9 wherein step (c) comprises determining a probability of sending an access message based on a product of said one of the first and second persistence values selected in step (b) and a pseudorandom value generated by the first communication unit.

13. A method of accessing a communication resource of a base station comprising at a first communication unit:

(a) receiving an access control message for the communication resource including a first access value for a first group of communication units and a second access value for a second group of communication units, the first group having a higher priority for access to the communication resource than the second group;

(b) selecting one of the first and second access values based on which one of the first and second groups the first communication unit is currently a member; and (c) determining a probability of sending an access message using said one of the first and second access values selected in step (b), and then sending the access message on the communication resource with a determined probability, wherein the access control message includes an inhibit message for the second group, and step (c) further comprises inhibiting the access message in response to the inhibit message.

14. A method of accessing a communication resource of a base station comprising, at a first communication unit:

(a) receiving an access control message for the communication resource including a first access value for a first group of communication units and a second access value for a second group of communication units, the first group having a higher priority for access to the communication resource than the second group;

(b) selecting one of the first and second access values based on which one of the first and second groups the first communication unit is currently a member; and (c) determining a probability of sending an access message using said one of the first and second access values selected in step (b), and then sending the access message on the communication resource with a determined probability, wherein the access control message includes an indication that in a current period of plural access periods access messages from the second group are to be inhibited, step (c) further comprising inhibiting the access message in response to the access control message when the first communication unit is one of the second group of communication units.

15. The method of claim 14, wherein the indication is a zero value for the second access value.

16. A communication system having a communication resource for use in accessing the communication system, comprising:

a base station transceiver adapted for communication to plural communication units;

a controller in communication with the transceiver operable for determining from system parameters a first persistence value for a first group of the communication units and a second persistence value for a second group of the communication units, the first group having a higher priority for access to the communication resource than the second group; and wherein the base station transceiver is responsive to the controller to transmit an access control message including the first and second persistence values.

17. The system of claim 16, wherein the communication resource is at least one communication channel available for use in communicating with the transceiver, and the controller is operable for determining (i) an approximate number v of ready communication units of both first and second groups, (ii) a first access probability $p_1$ for the first group based on the approximate number v of ready communication units, a proportion $\alpha$ of access requests by the first group to a total number of access requests by the first and second groups during a predetermined period, and an approximate maximum channel throughput value $\beta$, such that $p_1=(1+\alpha)(\beta/v)$, and (iii) a second access probability $p_2$ for the second group based on v, $\alpha$ and $\beta$ such that $p_2=\alpha\beta/v$.

18. The system of claim 16, wherein the communication resource is at least one communication channel available for use in communicating with the transceiver, and the controller is operable for providing plural access periods, including a first access period when the second group is inhibited from sending access messages and a second access period when both the first and second groups can send access messages.

19. The system of claim 18, wherein the controller is operable for determining, during the first access period, (i) an approximate number $v_1$ of ready communication units of the first group, (ii) the first persistence value $p_1$ for the first group based on the approximate number $v_1$ of ready communication units and an approximate maximum channel throughput value $\beta$, such that $p_1=\beta/v_1$, and (iii) setting the second persistence value $p_2$ for the second group to 0 in order to inhibit the second group from sending access messages.

20. The system of claim 18, wherein the controller is operable for determining, during the second access period, (i) an approximate number $v_1$ of ready communication units of the first group and an approximate number $v_2$ of ready communication units of the second group, (ii) the first persistence value $p_1$ for the first group based on the approximate number $v_1$ of ready communication units and an approximate maximum channel throughput value $\beta$, such that $p_1=\beta/v_1$, and (iii) determining the second persistence value $p_2$ for the second group based on $v_2$ and $\beta$, such that $p_2=\beta/v_2$.

21. The system of claim 16, further comprising a service node, coupled to the controller, operable for storing information regarding access attempts by the first and second groups to the communication resource within a predetermined period of time and communicating the information to the controller, wherein the controller is further operable for determining the first and second persistence values from the information.

22. A communication unit for communicating in a communication system comprising:

a transceiver for receiving an access control message including at least first and second persistence values from a base station of the system; and a processor operable for selecting a probability of sending an access request based on a current priority level of the communication unit and a persistence value of the first and second persistence values that corresponds to the current priority level.

23. The communication unit of claim 22, wherein the communication unit is a subscriber unit and the processor is further operable to inhibit sending the access request when the current priority level is less than a current service priority indicated by a received access control parameter.

24. The subscriber unit of claim 23, wherein the processor is further operable for determining the current priority level from one of a group consisting of a user priority level or a pending message priority level.

25. The communication unit of claim 22, wherein the at least first and second persistence values include a first persistence value for a first group of communication units and a second persistence value for a second group of communication units, the first group having a higher priority for communication than the second group, and the processor is further operable for determining a probability of sending the access request based on which of the first and second persistence values corresponds to the current priority level of the communication unit.

* * * * *